May 12, 1964 R. POLK, JR 3,132,734
FRUIT PREPARATION MACHINE AND METHOD
Filed Nov. 9, 1961 8 Sheets-Sheet 2
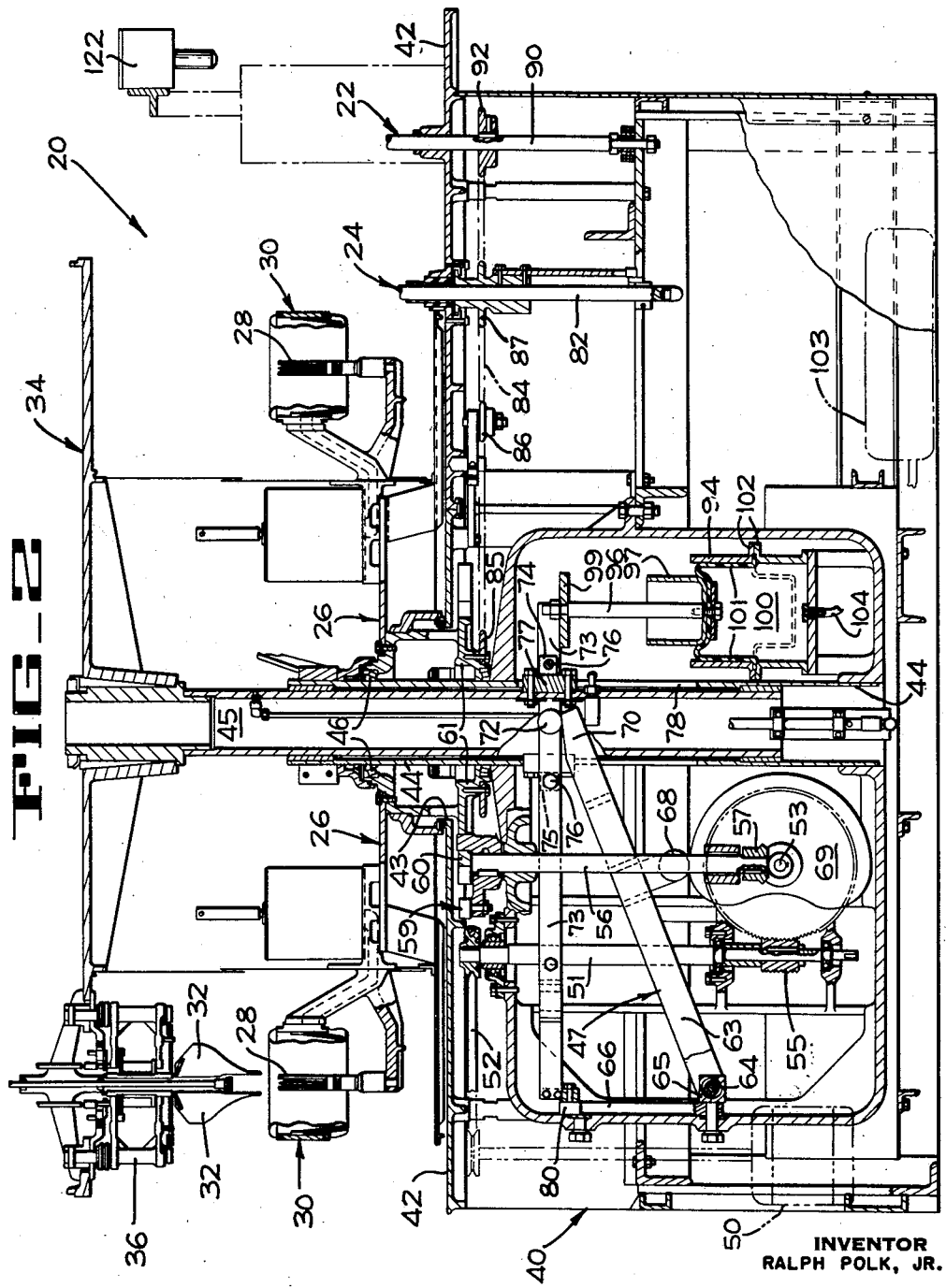
INVENTOR
RALPH POLK, JR.
BY Hans G. Hoffmeister
ATTORNEY

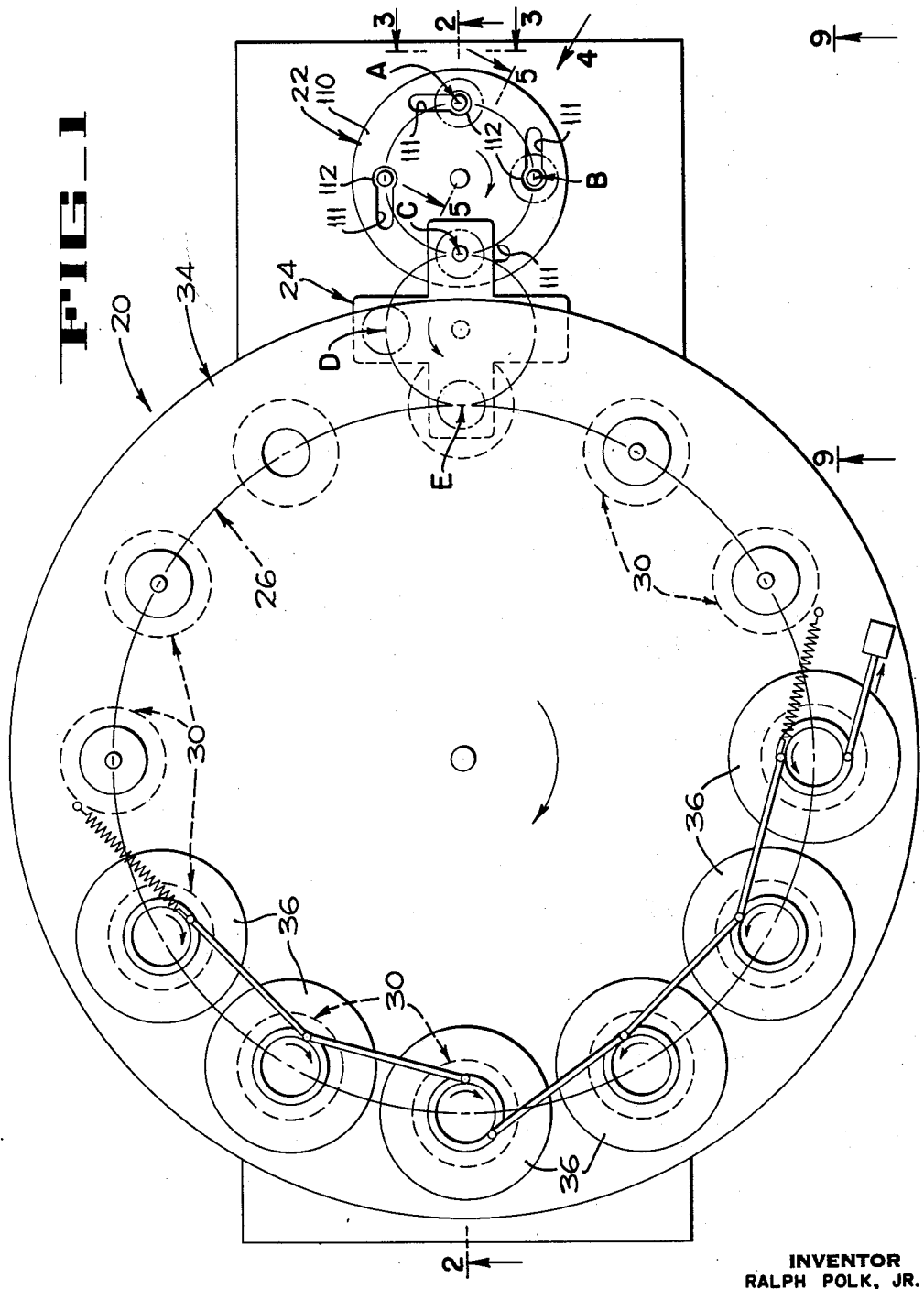

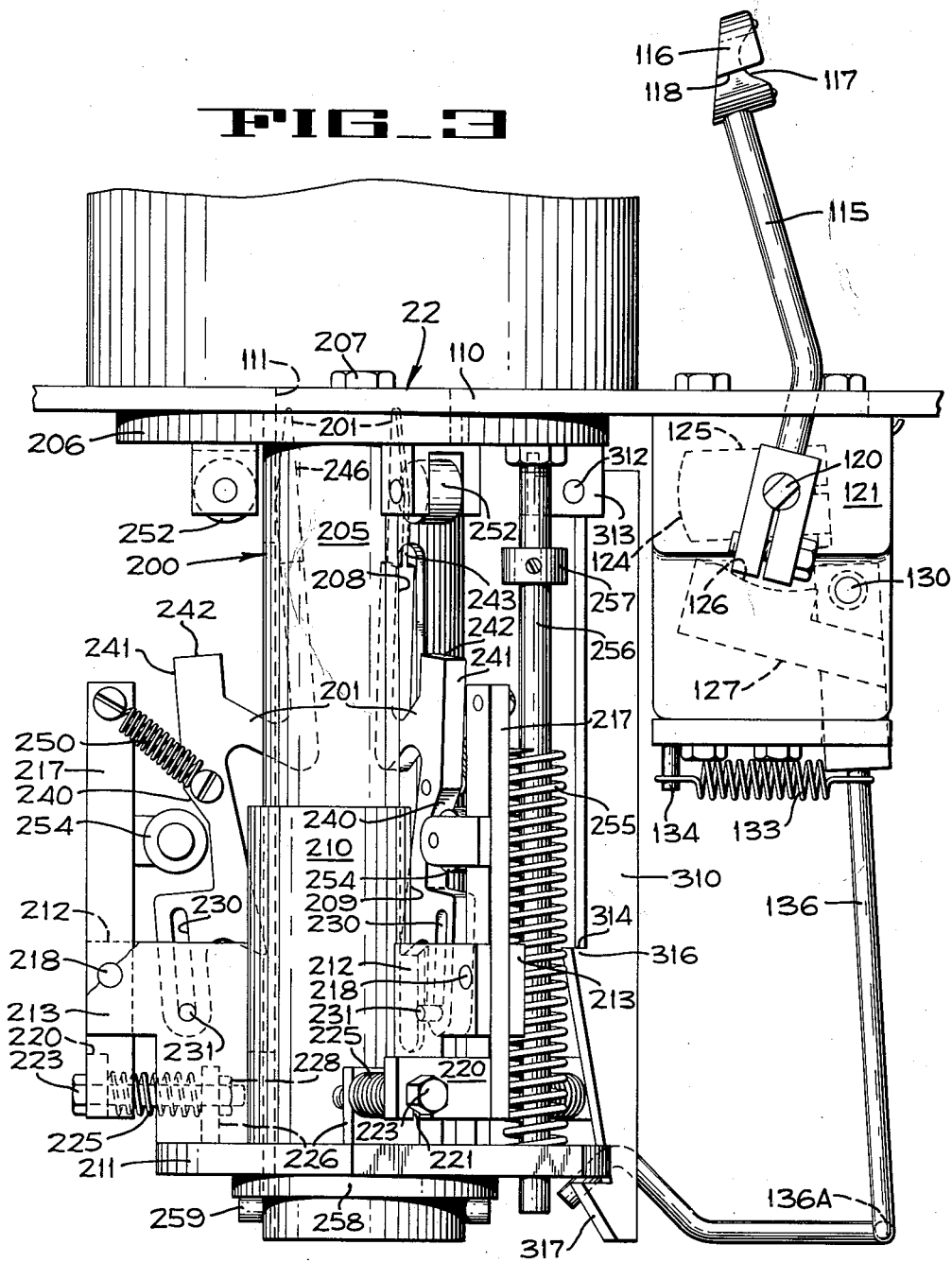

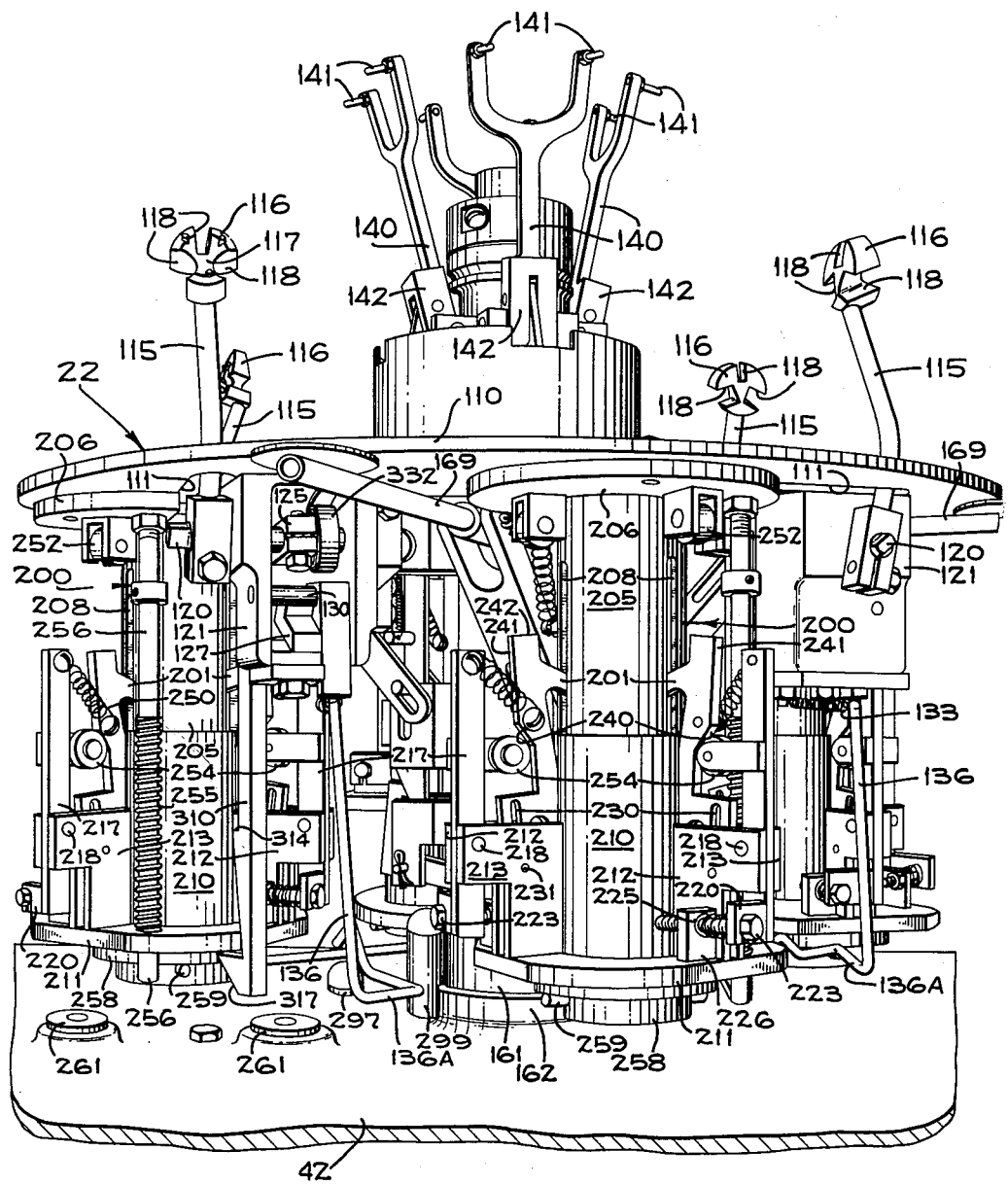

May 12, 1964 R. POLK, JR 3,132,734
FRUIT PREPARATION MACHINE AND METHOD
Filed Nov. 9, 1961 8 Sheets-Sheet 5
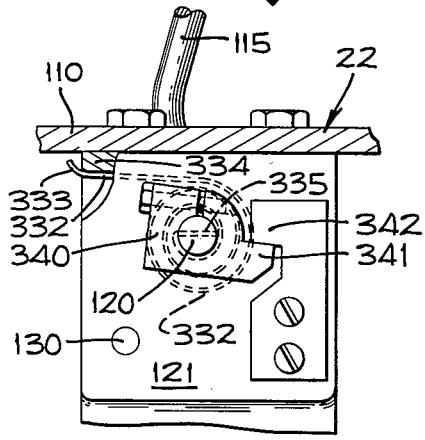
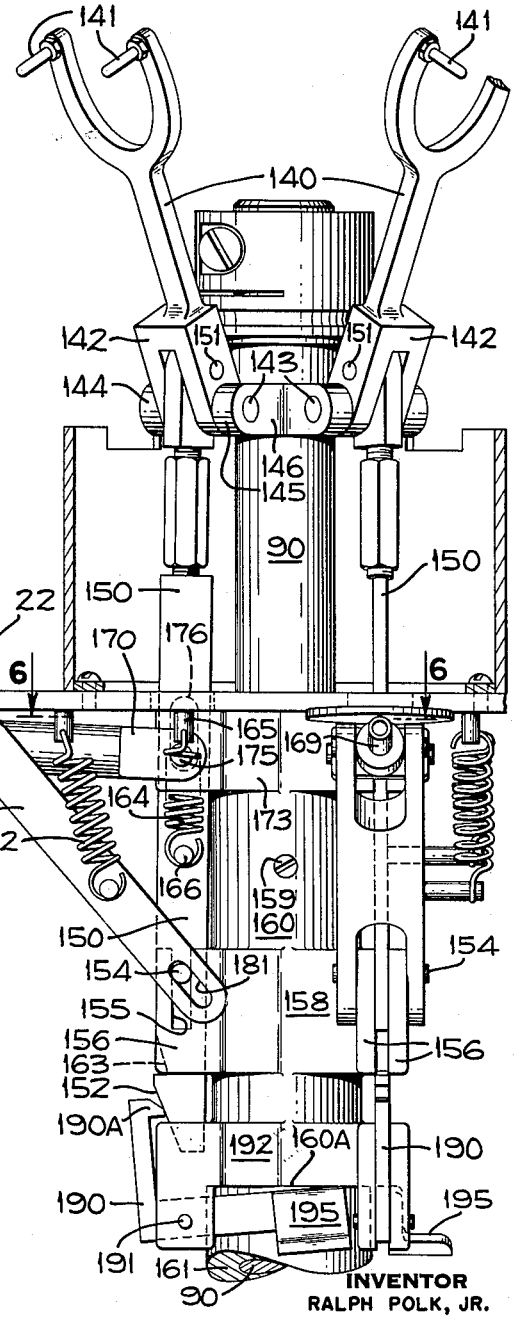
INVENTOR
RALPH POLK, JR.
BY Hans G. Hoffmeister
ATTORNEY

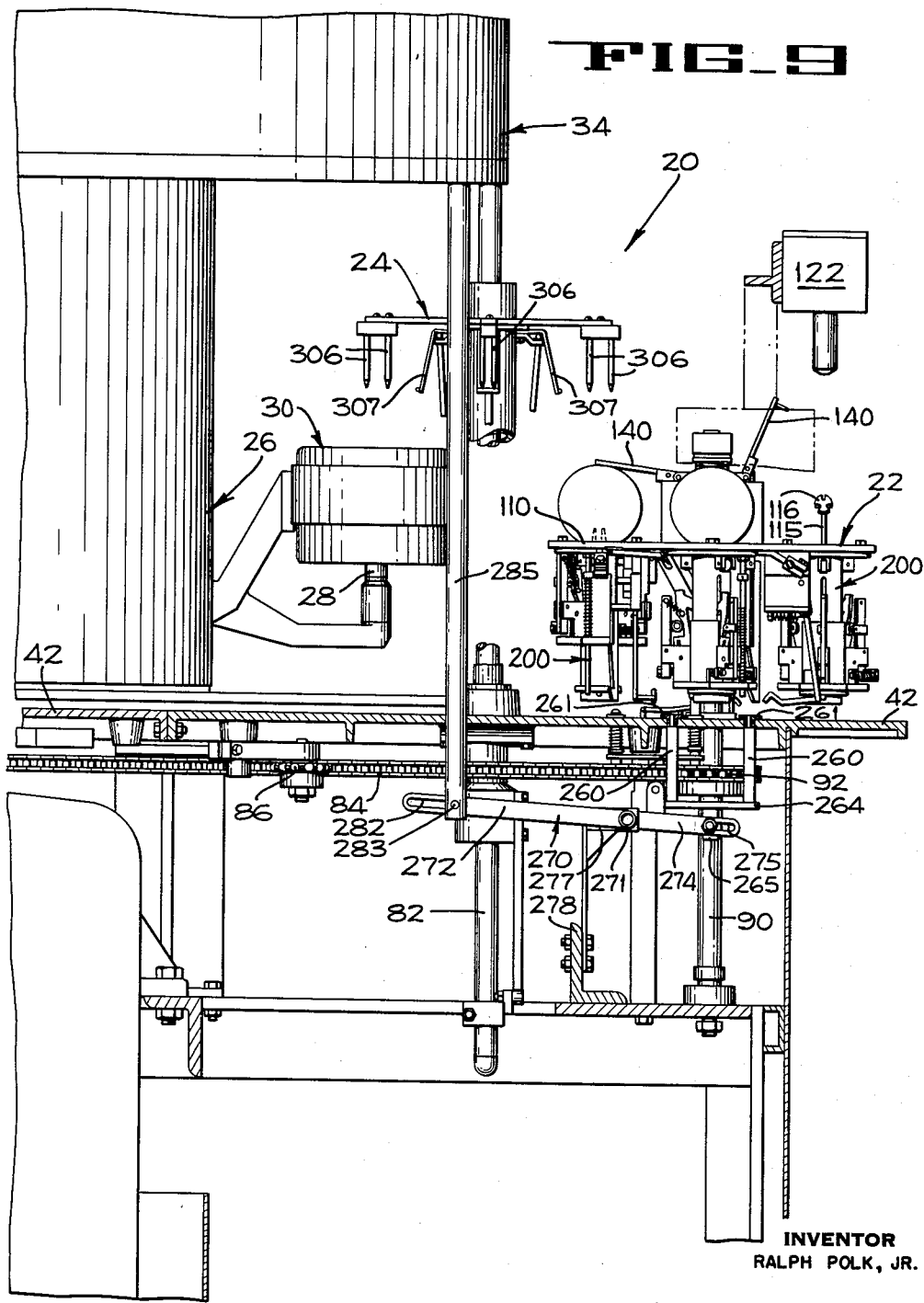

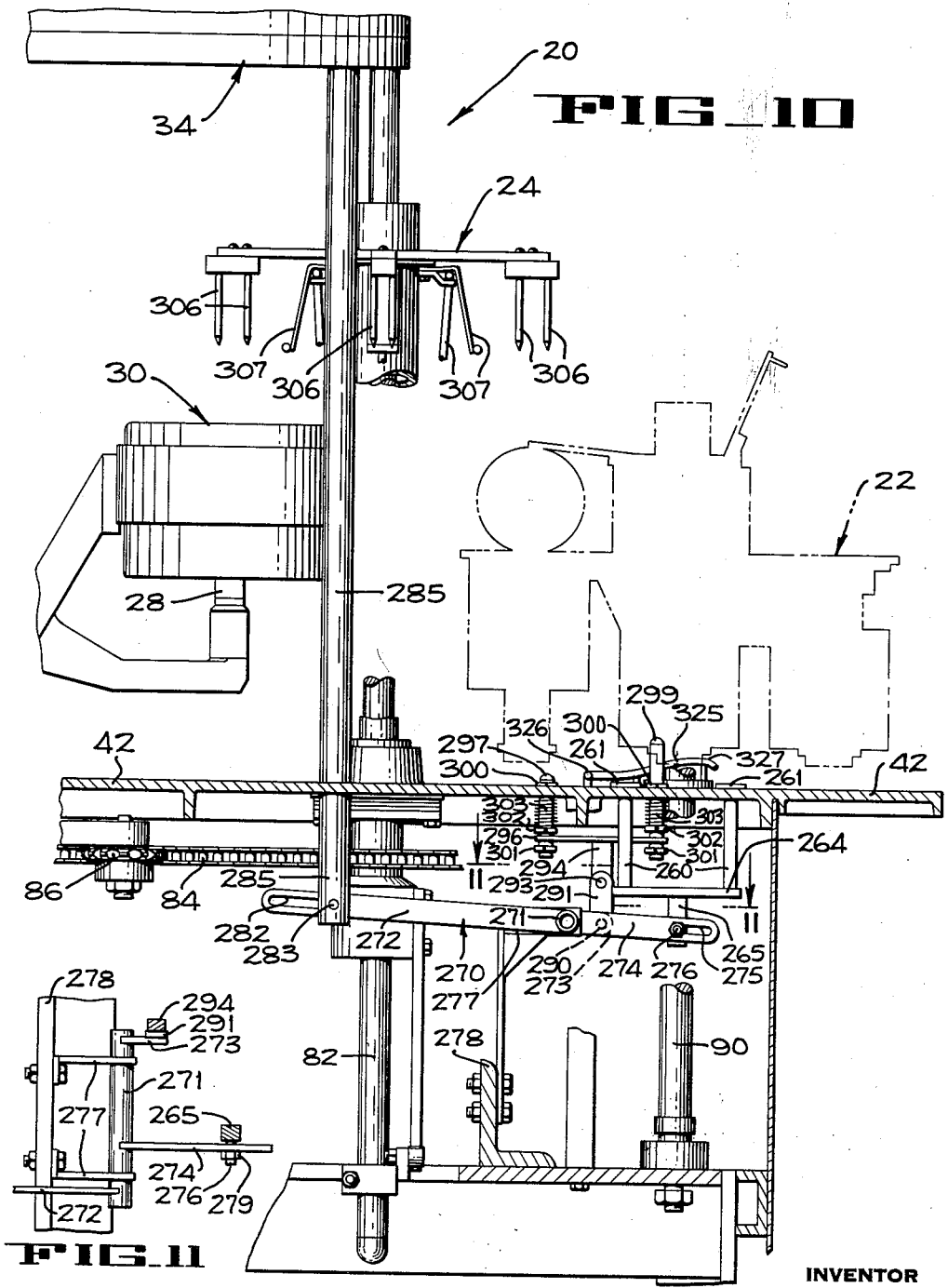

May 12, 1964 R. POLK, JR 3,132,734
FRUIT PREPARATION MACHINE AND METHOD
Filed Nov. 9, 1961 8 Sheets-Sheet 8
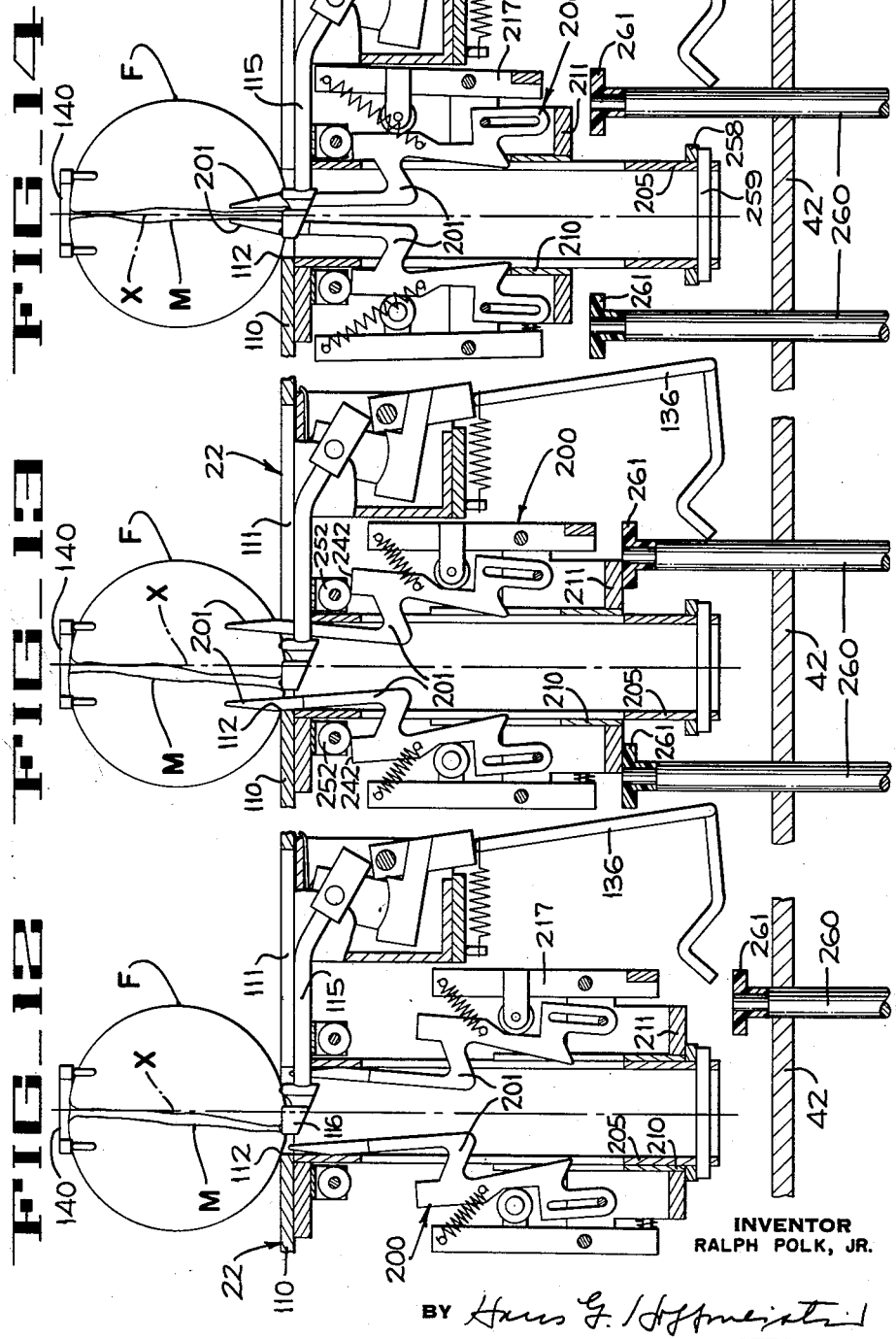
INVENTOR
RALPH POLK, JR.
BY Hans G. Hoffmeister
ATTORNEY

United States Patent Office 3,132,734
Patented May 12, 1964

3,132,734
FRUIT PREPARATION MACHINE AND METHOD
Ralph Polk, Jr., Box 3208, Tampa, Fla.
Filed Nov. 9, 1961, Ser. No. 151,241
9 Claims. (Cl. 198—33)

This invention pertains to a fruit preparation machine and more particularly concerns an improved method of and apparatus for orienting fruit, such as citrus fruit.

In the mechanical processing of fruit it is often necessary that the fruit be positioned so that its axis has a predetermined orientation before the processing tools are moved into engagement with the fruit. For example, in processing grapefruit in one type of machine, it is necessary that the stem-blossom axis of the fruit be disposed in a vertical position if the tools are to operate most effectively. Heretofore it has been difficult to obtain a positive orientation of the axis of grapefruit with the speed and accuracy necessary for a commercial operation. Accordingly, it is an object of the present invention to provide an efficient method of orienting the stem-blossom axis of citrus fruit, such as grapefruit.

Another object is to provide an improved orienting mechanism for a fruit preparation machine.

Another object is to provide an improved mechanism for controlling the movement of a plurality of fruit orienting fingers.

Other and further features, objects and advantages of the present invention will become apparent from the following description taken in connection with the accompanying drawings, in which:

FIGURE 1 is a schematic plan of a fruit processing machine in which the fruit orienting mechanism of the present invention may be incorporated.

FIGURE 2 is a fragmentary schematic section taken along line 2—2 of FIGURE 1.

FIGURE 3 is an enlarged fragmentary side elevation of one of the fruit orienting mechanisms of the present invention, the view being taken looking in the direction of arrows 3—3 of FIGURE 1.

FIGURE 4 is an enlarged fragmentary perspective taken looking in the direction of the arrow 4 of FIGURE 1, particularly showing the feed turret of the machine and several of the fruit orienting units mounted thereon.

FIGURE 5 is an enlarged fragmentary vertical section taken along line 5—5 of FIGURE 1 and particularly showing a fruit clamping mechanism that is associated with each fruit orienting mechanism on the feed turret.

FIGURE 6 is a fragmentary horizontal section taken along line 6—6 of FIGURE 5.

FIGURE 7 is a fragmentary vertical section showing the rear face of a support housing shown in FIGURE 3.

FIGURE 8 is a schematic plan, partly broken away and partly in section, showing an actuating linkage for the orienting mechanism of the present invention.

FIGURE 9 is a fragmentary side elevation of the machine of FIGURE 1, with parts in section, the view being taken looking in the direction of arrows 9—9 of FIGURE 1.

FIGURE 10 is a view similar to FIGURE 9 but drawn to a larger scale.

FIGURE 11 is a fragmentary horizontal section taken along lines 11—11 of FIGURE 10.

FIGURES 12, 13 and 14 are a series of diagrammatic sections showing consecutive operating positions of the fruit orienting mechanism of the present invention.

In FIGURE 1 the reference numeral 20 indicates generally a grapefruit sectionizing machine in which one embodiment of the fruit centering mechanism of the present invention is mounted. The machine 20 includes a feed turret 22, a transfer turret 24, and a main processing turret 26. All three of the turrets are arranged to be intermittently rotated about their respective axes, the turret 22 and 26 being movable in a clockwise direction while turret 24 is rotatable in a counterclockwise direction. During operation of the machine, a grapefruit is placed manually on the feed turret 22 at station A and is moved to station B and then to station C. At station C, the fruit is removed from the feed turret by the transfer turret 24 and is then carried successively to station D and to station E where the fruit is transferred to a prong unit 28 (FIG. 2) of one of twelve fruit carriers 30 on the main processing turret 26. While on the main processing turret the fruit is pierced from above by a plurality of sectionizing blades 32 that are carried on a vertically movable tool carrier 34. In one form of the machine there are five sectionizing blades 32 mounted on each of six heads 36 (FIG. 1), the heads being secured to the carrier 34 for vertical movement therewith. In order that the sectionizing blades can operate effectively, it is necessary that each grapefruit be positioned with its axis disposed substantially vertically. In accordance with the present invention, an improved mechanism is provided for sensing an out-of-vertical disposition of the axis of a grapefruit and for positively moving the fruit, while it is on the feed turret, until its axis is vertical.

In general, the sectionizing machine includes, in addition to the mechanisms already mentioned, a base 40 (FIG. 2) having a fixed generally rectangular table top 42 which has a central opening 43. A stationary tubular post 44 of circular cross-section is secured in the base 40 and projects upwardly through the opening 43. Near the upper end of the post 44, the main turret 26 is mounted on bearings 46 for rotation around the post, and an inner tubular post 45 is slidably journalled inside the main post 44 in suitable bearings. The tool carrier 34, which may be circular in horizontal plan, is mounted on the upper end of the slidable post 45 which is arranged to be raised and lowered by a lift mechanism 47.

The drive mechanism for the machine is mounted in the base 40 and includes a motor 50 which is shown in phantom lines in the sectional view of FIG. 2 since it is located ahead of the plane of this section. The motor 50 drives a vertical shaft 51 through a belt and pulley drive 52. A horizontal shaft 53, which is driven from shaft 51 through a worm gear unit 55, drives a second vertical shaft 56 by means of a bevel gear unit 57. The vertical shaft 56 effects intermittent movement of the main turret 26 through a Geneva drive mechanism 59 which has a driven gear 60 formed on a lower hub portion 61 of the turret 26.

The lift mechanism 47 comprises a lever 63 having a bifurcated end pivotally mounted at 64 on a block 65 that is secured to the lower end of a vertical guide bar 66 bolted to a rigid wall of the base 40. A roller follower 68, that is connected to lever 63, rides along the surface of a cam 69 which is keyed to the shaft 53. The lever 63 has a yoke 70 formed on its outer end which engages two diametrically opposed rollers 72 (one only being shown), each roller being carried on the side of one of two elongate parallel bars 73. The bars 73 are secured together by two transverse bars 74 and 75 to which the bars 73 are secured by capscrews 76. A pad 77, formed on transverse bar 74, projects through an opening 78 in the stationary post 44 and is bolted to the inner slidable post 45. The transverse bar 75 is bolted to the slidable post 45 in the same manner. Thus, when the cam 69 is rotated, the lift mechanism 47 controls the raising and lowering of the slidable post 45 by means of the collar formed by the parallel bars 73 and transverse bars 74 and 75.

To prevent rotation of the post 45 while it is being raised and lowered, two rollers 80 (one only being shown)

are mounted on the ends of the bars 73, one roller being disposed on each side of the fixed guide bar 66.

The transfer turret 24 has a drive shaft 82 that is driven from the hub portion 61 of the main turret 26 by a chain 84 that is trained around a sprocket 85 on said hub portion and around an idler sprocket 86 and engages a sprocket 87 keyed to the transfer shaft 82. Since the turret 24 must move vertically relative to the shaft 82, it must be connected to the shaft by a mechanism which will key the turret to the shaft for rotation therewith while permitting relative movement between the turret and the shaft. The particular mechanism used herein is described in detail in the pending application of Ralph Polk, Jr., Serial No. 730,298, now Patent No. 3,030,990. A drive shaft 90 of the feed turret 22 is driven by the chain 84 which is disposed around a sprocket 92 keyed to the shaft 90. The chain is trained around the sprockets 87 and 92 in opposite directions so that the two turrets 22 and 24 are rotated in opposite directions. It will be evident that the three turrets 22, 24 and 26 are intermittently driven in timed relation through the Geneva drive 59, and that the tool carrier 34 is raised and lowered in timed relation with the indexing movements of the three turrets.

The weight of the tool carrier 34 and its associated mechanism is carried jointly by the cam 69 of the lift mechanism and by a pneumatic counterbalance mechanism which includes an open top cylinder 94, that is secured to the base 40. A piston rod 96 extending from a piston 97, that is movable in cylinder 94, is secured to a plate 99 that is bolted to the parallel bars 73, the upper end of piston rod 96 being disposed between the bars 73.

A generally tubular, air tight expansible and contractible air reservoir 100 is formed within cylinder 94 below the piston 97 by a flexible diaphragm 101. The diaphragm 101 is made of a thin material that is air tight, pliable, and resistant to citric acid. A material which has been found to be satisfactory is a nylon cloth impregnated with a synthetic rubber such as Nitrile. The diaphragm 101 has an upper wall secured to the piston 97 and a lower annular end secured between annular flanges 102 of the cylinder. As the piston moves up and down in the cylinder, the diaphragm flexes between the upper position shown in full lines to the lower dotted line position. An air conduit 104 extends through the lower wall of the cylinder and communicates with the interior of the air reservoir 100. The conduit 104 is also connected to an air supply such as the usual air bottle or container 103 in which air is maintained under a constant pressure. A manually adjustable pressure regulator (not shown) is provided to vary the air pressure to the reservoir.

When the tool carrier 34 is lowered under the control of the cam 69, air in the closed system below the piston 97 is compressed. Then, when the carrier 34 is again raised, the expanding air applies a lifting force through the bars 73 to augment the lifting force of the cam. By regulating the pressure of the air in the system, an optimum percentage of the weight of the tool carrier will be carried by the pneumatic system. It is desirable that the pneumatic system bear about 80 percent of the weight of the tool carrier 34. With such an arrangement, the machine operates smoothly, and the cam 69 and associated parts are small enough to be efficiently arranged in the base.

The feed turret 22 comprises a plate-like member 110 (FIG. 1) secured to the upper end of the shaft 90. Four identical keyhole slots 111 are cut through the plate at points spaced equi-angularly around the shaft 90, each slot providing an enlarged circular opening at one end that defines an arcuate fruit support surface 112. The support surface 112 is, of course, an arc of a circle and as will appear presently, the fruit is oriented relative to the axis of that circle. A fruit guide arm 115 (FIGS. 3 and 4) is associated with each slot 111, each arm having a generally circular head 116 that has a concave face 117 and is provided with three equi-spaced notches 118 (FIG. 4). Each arm 115 is clamped on a shaft 120 which is rotatably journalled in a housing 121 secured to the undersurface of plate 110. During the manual positioning of the grapefruit on the feed turret, the operator places the button at the stem end of the fruit against the concave face 117 of the guide arm which is, at that time, at station A of the turret, and then pivots the arm downwardly to position the stem end of the grapefruit on the associated substantially annular fruit support surface 112. After the fruit is disposed on the surface 112, the operator shifts the blossom end of the fruit, pivoting it about the axis defined by the center of the circle of which the surface 112 is an arc to bring the depression at the blossom end of the fruit into alignment with a vertical beam of light projected downwardly from a projector 122 (FIG. 2). The projector 122 may be of the type disclosed in the U.S. patent to Cox No. 2,901,087.

When the guide arm 115 is swung downwardly to position the fruit on the annular surface 112, an arcuate friction surface 124 (FIG. 3) of a block 125, that is keyed to shaft 120 and is disposed inside housing 121, engages a mating friction surface 126 of a locking lever 127. The lever 127 is rotatably mounted on a short shaft 130 that extends across the interior of the housing 121. A spring 133, which is connected between a fixed pin 134 on the housing and a lower extension arm 136 of the locking lever 127, urges the lever in a clockwise direction (FIG. 3). Accordingly, when the guide arm 115 is swung downwardly, the block 125 engages the upper end of lever 127 which yields to permit the arcuate surface 124 of block 125 to move into engagement with surface 126. The spring 133 then exerts a force in a direction to aid in maintaining the frictional engagement of the surfaces 124 and 126. The extension 136 has a generally horizontal portion 136A (FIG. 4) which is engaged by a release cam, which will be described presently, for releasing the frictional locking engagement of the surfaces 124 and 126.

When the fruit has been adjusted so that the depression at the blossom end of the fruit is directly under the vertical beam of light, a clamping lever 140 (FIG. 4) is swung downwardly to move two pins 141 on the U-shaped end of the lever into engagement with the blossom end of the fruit to clamp the fruit on the base plate 110 of the feed turret. There are four clamping levers on the feed turret, each lever being disposed in radial alignment with one of the annular fruit support surfaces 112 of the base plate. The length of each lever is such that its two pins 141 engage the grapefruit on opposite sides of the depression of the blossom end of the fruit. Since all four clamping levers 140 and their control linkages are identical, a description of one lever and its associated linkages will disclose the construction and operation of all four.

Each clamping lever has a yoke 142 (FIG. 5) pivotally mounted on a pin 143 that is fixed to and extends between two short mounting arms 144 and 145 that are carried by a collar 146 secured to the turret shaft 90. An adjustable link 150 is pivotally mounted at its upper end on a pin 151 that extends between the arms of the yoke 142. At its lower end, the link 150 is provided with a camming surface 152 and, just above the camming surface 152, a pin 154 is secured in the link 150 and projects from opposite sides thereof into and through slots 155 (one only being shown) in two mounting tabs 156 formed on a support collar 158. The collar, which carries four sets of tabs 156, is formed integral with a mounting sleeve 160 which is secured by screw 159 to the shaft 90. A tubular spacer 161 is disposed around post 90 between the lower end 160A of sleeve 160 and a boss 162 (FIG. 4) on the table top 42. A notch 163 is formed in the lower end of link 150 just above the cam surface 152. A spring 164, connected between a pin 165 on the base plate 110 and a pin 166 on link 150, urges the link upwardly.

The link 150 is moved downwardly by means of a manually operated lever 169 which is provided with a yoke 170 (FIG. 6) whose spaced arms are disposed on opposite sides of a pair of mounting tabs 172 formed on a collar 173 that is integral with the sleeve 160 and is secured, as by capscrews (not shown) to the base plate 110. A pivot pin 175 extends through the arms of yoke 170, the two tabs 172, and through a slot 176 (FIG. 5) in the link 150. With this arrangement, the lever 169 is pivotally mounted on the tabs 172. Downward movement of lever 169 is transmitted to the link 150 by a bar 179 that is pivoted at one end on a pin 180 projecting from lever 169 and has a slot 181 at its opposite end that receives one end of the pin 154 carried by the link 150. When the wall at the upper end of slot 181 engages pin 154, further downward movement of the lever 169 will cause downward movement of link 150 against the resistance of a spring 182 connected between the bar 179 and the base plate 110.

As the clamp lever is moved downwardly into engagement with the grapefruit, the camming surface 152 on the lower end of the link 150 engages a latching lever 190 which pivots counterclockwise on a pin 191 that is mounted on a bracket 192 integral with the sleeve 160. When the clamp has engaged the fruit, the latching lever 190 is pivoted clockwise due to the weight of an abutment plate 195 carried on the opposite end of the latching lever. Clockwise movement of lever 190 causes a nose portion 190A of the lever to move into the latch recess 163 on the link 150. When the operator releases the clamp actuating lever 169, the spring 164 draws the link 150 upwardly, causing the nose 190A to be frictionally gripped by the wall portion at the lower end of the latch recess.

Since the sleeve 160 is secured to the turret shaft 90, the collars 173, 158 and 192 are integral with the sleeve 160, and base plate 110 is secured to collar 173, rotation of turret shaft 90 will cause rotation of the base plate 110, the four clamping levers 140 and their actuating mechanisms.

In FIG. 12 a fruit F is illustrated after it has been clamped in position on the feed turret at station A. It will be noted that, although the operator attempted to center the fruit on the circular support surface 112 by placing the stem end of the fruit against the head 116 of the guide arm 115, she did not achieve an accurate alignment. Accordingly, even after the upper blossom end of the fruit was positioned under the vertical beam of light and the clamping lever 140 was moved into engagement with the fruit, the stem-blossom axis of the fruit still remained at an angle to the vertical. In accordance with the present invention, an orienting mechanism 200 is provided which includes a plurality of orienting or centering fingers 201 that are arranged to be projected upwardly through the circular opening in plate 110, that defines the annular support surface 112, and into the fruit that is clamped on the surface 112. Then all of the fingers 201 are moved radially inwardly toward a vertical axis X defined by the center of the annular surface 112 and the vertical light beam projected downwardly from projector 122. If the stem-blossom axis of the fruit is not in alignment with this axis, one of the radially moving fingers 201 will engage the relatively tough core material M, that is disposed along the axis of each fruit, and will shift the lower end of the core toward the axis X. The oriented, centered position of the fruit is indicated in FIGURE 14. It will be understood, of course, that if the fruit has been properly centered by the operator the centering fingers 201 will move radially through the easily penetrated part of the fruit around the core without causing any shifting of the fruit.

One fruit orienting mechanism 200 (FIGS. 3 and 4) is mounted on the feed turret 22 below each fruit support surface 112. The four orienting mechanisms are identical, and each comprises a center tube 205 that has an upper flange 206 secured to the plate 110 by capscrews 207 (one only being shown). The axis of each tube 205 is in alignment with the center of one of the four circular fruit supporting surfaces 112 on plate 110. The orienting mechanism shown in FIG. 3 has three centering fingers 201, only two of which are shown, and accordingly the tube 205 has three vertical slots 208 that are spaced at 120° intervals around the periphery of the tube. A lifter sleeve 210 is slidably disposed on the tube 205, said sleeve having three longitudinal slots 209 and a lower flange 211 adapted to support three pairs of inverted L-shaped mounting plates 212 and 213. The plates 212 and 213 of each pair are spaced from each other to define a slot that is disposed in a plane projecting radially from the axis, and each plate is secured as by welding, to the outer surface of sleeve 210 and to the upper surface of flange 211. A centering finger actuator lever 217 is disposed between each pair of plates 212 and 213, being pivotally mounted on a pin 218 that extends between the plates. At its lower end each actuator lever 217 carries a laterally projecting tab 220 which has a slot 221 arranged to receive the shank of a bolt 223. A spring 225 is disposed around the bolt 223 between the tab 220 and an upstanding abutment member 226 that is fixed to and projects upwardly from flange 211. The spring exerts a force on the lever 217 tending to swing the upper end of the lever inwardly, and a nut 228 on the bolt 223 engages the abutment member 226 to determine the innermost position of the upper end of lever 217.

Each centering finger 201 has a lower end portion disposed between a pair of the plates 212 and 213, said end portion having a slot 230 arranged to receive a pin 231 that extends between the plates. Intermediate its ends each finger 201 is provided with a camming surface 240, a flat surface 241, and an end surface 242. As seen in FIG. 3, each finger extends through a pair of aligned slots 208 and 209 and the upper end portion of each finger is formed as a relatively thin blade-like element 243 having a pointed upper end that may be sharpened to permit the finger to easily penetrate the lower end of the fruit. The radially inner edge 246 of each finger is flat so that it can effectively engage core material and shift it laterally toward the vertical reference axis defined by the vertical light beam of projector 122 and the center of the circular aperture 112 in the support plate 110.

During the time a grapefruit is being positioned and clamped on the support surface 112, the upper ends of the centering fingers 201 are below the level of said surface, as seen in FIG. 3. When the orienting operation is started, the carrier sleeve 210 is moved upwardly by a lift mechanism which will be described presently. As the sleeve 210 moves upwardly, three springs 250 which are connected between the levers 217 and the intermediate portions of the centering fingers pull the centering fingers upwardly causing the fingers to penetrate the fruit. When the fingers have penetrated a desired distance, the upper edge 242 of each centering finger engages a roller 252 that is rotatably mounted on the underside of the flange 206. The upward movement of the fingers is stopped but the carrier sleeve 210 continues upwardly, stretching the springs 250 and causing rollers 254 carried on the levers 217 to engage the camming surfaces 240 of the centering fingers. During continued upward movement of the rollers 254, they force the centering fingers 201 radially inwardly of the tubular post 205, causing the flat abutment surfaces 246 of the fingers to engage core material in the fruit and shift the fruit toward the centered position.

It will be noted that the spring 225 which engages the lower end of each lever 217 will permit the upper end of the lever to swing outwardly when the centering fingers have shifted the core material as far as possible toward centered position. Accordingly, the springs 225 provide a yieldable mounting for the levers 217 so that the centering fingers 201 can accommodate their inward movement to the size and bulk of the core material of the fruit.

Upward movement of carrier 210 is resisted by a spring 255 that is disposed around a rod 256 between a fixed collar 257 on the rod and the flange 211. The rod 256 is fixed to and depends from the upper flange 206 and has a lower end portion slidably disposed in a hole in flange 211. The spring 255 tends to urge the carrier sleeve 210 to a lowered position in which its bottom surface engages a collar 258 that is disposed around post 205 and abuts a pin 259 projecting from the post.

The mechanism for lifting the carrier sleeve 210 comprises a pair of vertical posts 260 (FIGS. 9 and 10), that extend through openings in main support table 42 of the machine and have enlarged circular heads 261 disposed above the table directly under the base flange 211 of the carrier sleeve 210, as shown in FIG. 13. The two posts 260 are rigidly connected at their lower ends to a flat mounting strap 264 (FIG. 10) that has a pin 265 extending downwardly from the central portion of its underside. The posts 260 are raised and lowered by means of a composite lever 270 that includes a tubular pivot member 271 (FIG. 11), an actuating arm 272, a short lifter arm 273 and a long lifter arm 274 that has an end portion provided with a slot 275 (FIG. 10) adapted to receive a pin 276 projecting laterally from the depending pin 265. A nut 279 is disposed on the threaded end of the pin 276. The tubular pivot member 271 is rotatably journalled in two arms 277 of a fixed bracket 278. The actuating arm 272 is provided with a slot 282 arranged to receive a pin 283 projecting laterally from a rod 285 that is secured to and projects downwardly from the overhead tool carrier 34. When the carrier 34 is moved downwardly, the lever 270 is pivoted counterclockwise (FIG. 10), causing the arm 274 to raise the two posts 260 upwardly to engage the undersurface of the flange 211 of the carrier sleeve 210.

The short arm 273 of the composite lever 270 is pivotally connected at 290 to a short link 291 which, in turn, is pivoted at 293 to an arm 294 that projects downwardly from a plate 296. At its opposite ends, the plate has apertures which receive a short post 297 and a tall post 299 in slidable, guided engagement. Each post projects through an opening in table top 42 and is provided with a fixed collar 300 which abuts the table top to limit the downward movement of the post and define its lowered position. A collar 301 is secured to each post below the plate 296 and a collar 302 is secured to the post above plate 296. When the plate 296 is raised, it engages the collars 302 and lifts the posts 297 and 299 against the resistance of springs 303 that are disposed around the posts between each collar 302 and the table top 42.

As seen in the plan view of FIGURE 8, the short post 297 and the tall post 299 are disposed adjacent the station C of the feed turret, said station being indicated by the intersection of two phantom lines. The tall post 299 is disposed adjacent the sleeve 160 at the center of the feed turret 22 in position to engage the abutment plate 195 (FIG. 5) of the latch mechanism of the fruit clamping arm 140 that is disposed, at that particular time, at station C. Accordingly, when a clamped fruit reaches station C, and the tool carrier 34 is moved downwardly, the composite lever 270 is pivoted and the long post 299 is raised to engage arm 195 and release the fruit clamp arm 140. The spring 164 (FIG. 5) then raises the arm 140 and the actuating lever 169 to their upper position. It will be noted in FIG. 10 that the transfer turret 24 also moves downwardly with the tool carrier 34 to bring four prongs 306 into engagement with the released fruit. A clamp device 307, which forms no part of the present invention, is associated with each set of prongs 306 to lock the fruit on the prongs preparatory to subsequent indexing movements of the transfer turret.

The short post 297 is arranged to release the centering fingers 201 when they are disposed at station C. Referring to FIGURE 3, it will be noted that a latch lever 310 is pivotally mounted at 312 on a tab 313 depending from the flange 206. The latching lever 310 has a notch 314 formed on its inner edge. When the carrier sleeve 210 is moved upwardly, the side edge of flange 211 pivots the lever outwardly. After the centering fingers 201 have penetrated the fruit and have been moved radially inwardly to center the fruit, the flange 211 reaches a point above notch 314, and lever 310 swings inwardly so that a ledge 316 underlies the flange 211 and prevents downward movement of the carrier. Thus, the centering fingers remain in engagement with the centered fruit until they reach station C. Then when the turret is stationary, the short post 297 is raised to engage a slanted surface 317 on the lower end of lever 310 and cams the lever radially outwardly away from the axis of post 205. This outward movement of lever 310 removes the ledge 316 from under the flange 211 of the carrier and the spring 255, which was compressed during upward movement of the carrier, forces the carrier 210 to its lower position.

After a centered fruit has been removed from the feed turret, and the centering unit is moved away from station C, the lower horizontal portion 136A of the extension arm 136, that is part of the latch mechanism for the pivotal guide arm 115, engages a cam bar 325. As seen in FIGURE 10, the cam bar 325 has a lower end 326 adjacent station C and an elevated end 327 approximately 90° past station C. Accordingly, after each centering unit leaves station C, the portion 136A of arm 136 rides up cam bar 325 until the arm 136 is pivoted counterclockwise (FIG. 3) sufficiently to move friction surface 126 away from surface 124. A torsion spring 332 (FIG. 7) that has one end 333 anchored against an edge of a depending wall 334 of housing 121 and an opposite end 335 disposed in a slot in the shaft 120, swings the shaft 120 counterclockwise to raise the guide arm 115 to upright position. A collar 340 that is clamped on shaft 120 has an arm 341 which engages a stop 342 secured to housing 121, to define the uppermost pivoted position of the guide arm 115.

A brief résumé of the operation of the fruit centering mechanism will be given with particular reference to the operational views of FIGURES 4, 12, 13 and 14. When the operator standing at station A of feed turret 22 picks up a peeled grapefruit, she places the button at the stem end of the fruit against the head of the guide arm 115 and swings the arm downwardly to position the fruit on the generally circular support surface 112 of plate 110. As the arm 115 reaches its lowered position, the friction surfaces 124 and 126 are urged into gripping engagement to hold the arm in the lowered position.

When the fruit reaches its position on support surface 112, the operator centers the top of the fruit under the vertical light beam, grasps lever 169 and swings the clamp 140 down into engagement with the fruit. When the feed turret is next indexed, the clamped fruit is moved to station B. While the feed turret is stationary, the tool carrier 34 is moved downwardly, causing the two posts 260 to move upwardly to engage the lower edge of the carrier sleeve 210 to raise it. As the sleeve is elevated, the three springs 250 draw the centering fingers 201 upwardly, causing the upper pointed ends to move through the circular opening in the support plate 110 to engage and penetrate the fruit clamped thereon. When the abutment surfaces 242 on the fingers come into contact with the rollers 252, as seen in FIGURE 13, the upward movement of the centering fingers is stopped, however, the carrier sleeve continues upwardly, causing the rollers 254 on levers 217 to engage cam surfaces 240 and swing the centering fingers inwardly about pivot pins 231. It will be noted that the notches 118 in the head of the guide bar 115 receive the fingers 201. At least one of the flat abutment surfaces 246 of the fingers 201 engage core material of the fruit and shift it, as seen in FIG. 14, toward the reference axis defined by the axis of tube 205, the vertical beam of light from projector 122 and the center of the circle on which the circular portion of the fruit support surface 112 is formed. It is to be noted that, during this movement of the lower end of the fruit, the upper end is held in a relatively fixed position by the clamp 140. Accordingly, the clamp at the upper end of the fruit acts as a pivot about which the lower end is swung.

After the fruit has been centered and the centering fingers are locked in their upper position by the latch lever 310, the feed turret is indexed to move the fruit to station C. During the next downward movement of tool carrier 34, a prong unit on the transfer turret penetrates and grips the fruit on the feed turret. After the prongs have engaged the fruit, the short post 297 releases the carrier sleeve latch lever 310 (FIG. 3) and the tall post 299 releases the latch lever 190 (FIG. 5) associated with the clamp arm 140. The fruit is then lifted away from the feed turret by the transfer turret during the next upward movement of the tool carrier 34. When the centering device is moved away from station C, the latch arm 136 engages cam bar 325 causing the guide arm 115 to be swung to upright position by torsion spring 332.

From the foregoing description, it will be evident that the present invention provides a new and effective method of centering citrus fruit. While only citrus fruit has been discussed, it is evident that this mechanism is effective in orienting any fruit having relatively tough material, such as a core, that can be engaged by the fingers. The mechanism for moving the centering fingers upwardly and then radially inwardly makes possible, for the first time, the positive orientation of the stem-blossom axis of a fruit.

It will be evident that modifications and variations may be effected without departing from the novel concepts of the present invention. Accordingly, it is to be understood that the present invention is not limited except by the scope and proper interpretation of the appended claims.

I claim:

1. In a fruit preparation machine, a fruit support having an opening therein, means for engaging the upper portion of a fruit disposed on said support over said opening to hold said portion in substantially fixed position, a plurality of fruit orienting fingers mounted in a uniform pattern around a point disposed centrally of said fingers, said fingers being arranged to project through said opening to receive the fruit in impaled relation thereon, means mounting said fingers for movement inwardly toward said central point to engage core material in the fruit and move it toward said point, and means for moving said fingers inwardly.

2. In a fruit preparation machine, a fruit support member having a hole therein formed symmetrically about a central axis, means for clamping a citrus fruit on said fruit support member with one end of the axis of the fruit disposed adjacent the center of said hole, a plurality of centering fingers mounted below said support member for movement upwardly through said hole to penetrate the fruit disposed thereabove at points spaced from the stem-blossom axis of the fruit, and means for moving said centering fingers radially inward toward the center of said hole to engage core material disposed along the stem-blossom axis of the fruit and shift it toward said center.

3. In a fruit preparation machine, a support member having an opening formed symmetrically about a central axis and defining a fruit support surface, a clamp member having an end portion disposed directly above said opening and arranged to engage one end of a citrus fruit adjacent the stem-blossom axis thereof and hold the fruit on said support member with the other end of the stem-blossom axis disposed on said support surface adjacent the center of said opening, a plurality of centering fingers mounted for movement from a position below said support member upwardly through said opening and into the fruit clamp on said support surface, and means for moving the centering fingers radially inwardly toward the center of the opening to engage core material on the lower end of the fruit adjacent the opening and move it toward the center axis while the upper end of the fruit is held by said clamping member.

4. In a fruit preparation machine, a fruit support plate having a horizontal support surface with an aperture therein formed around a central axis, means for guiding a citrus fruit to a supported position on said support member adjacent said aperture with one end of the stem-blossom axis of the fruit disposed adjacent the center of said aperture, a clamp member having an end portion movable to a position directly above said aperture to engage the other end of the fruit and clamp the fruit in position on said support member, a plurality of centering fingers mounted below said support member for movement vertically upwardly through said aperture to engage and penetrate the fruit clamped on said support member at points spaced from the stem-blossom axis of the fruit at the lower end thereof, means for moving said fingers radially inwardly toward the axis of said aperture to engage core material of the fruit and shift it toward the center of said aperture while the upper end of the fruit is held in position by said clamp member.

5. In a fruit preparation machine, a support member having a generally horizontal support surface with a hole therein formed about a central axis, a projector mounted directly above said support member and arranged to project a beam of light vertically downwardly through the hole along the axis thereof, means for guiding a citrus fruit to a supported position on said support member with one end of the stem-blossom axis of the fruit disposed adjacent the axis of said hole, a clamp member having an end portion movable to a position directly above said hole to engage the citrus fruit at the other end of the stem-blossom axis and clamp the fruit on said support member, and means for engaging the lower end of the fruit and shifting it toward the axis defined by the vertical beam of light and the center of said hole.

6. In a fruit preparation machine, a fruit support member having an aperture therein, means for clamping a citrus fruit in position over said aperture with the stem-blossom axis disposed in a generally vertical orientation and with a reference mark at one end of the fruit disposed adjacent the center of said aperture, and a plurality of centering fingers mounted below said support member for movement upwardly through said aperture into engagement with the fruit clamped thereon, and means for moving said fingers radially inwardly toward the center of the aperture, each finger having a flat body portion disposed on a radius from said hole center and having a flat abutment surface on the radially inner edge adapted to engage core material of the fruit and shift it toward the center of said aperture.

7. In a method of orienting the stem-blossom axis of a grapefruit, the steps of disposing the grapefruit on a support surface with the upper end of the stem-blossom axis facing upwardly whereby said upper end is disposed on an imaginary vertical reference line with its axis inclined from said line, shifting a reference mark on the upper end of the fruit to a particular position, gripping the upper end of the fruit adjacent the fruit axis to hold said upper end on said reference line, and thereafter engaging the fruit adjacent the lower end thereof and shifting it to a position wherein its axis is in generally vertical alignment with the reference mark at the upper end of the fruit while maintaining pressure on the upper end.

8. In a method of centering a grapefruit the steps of disposing the grapefruit on a support surface with the stem-blossom axis in a generally vertical position, shifting a reference mark on the upper end of the fruit to a particular position, and simultaneously holding the upper end of the fruit in fixed position and gripping the lower end of the fruit and shifting it toward an imaginary vertical axis passing through the reference mark on the upper end of the fruit.

9. In a fruit preparation machine, a fruit support adapted to receive a fruit with one end of the core axis of the fruit facing upwardly and disposed on an imaginary vertical reference line, means for engaging the upper end of the fruit to hold said end in generally fixed position on said reference line, and a plurality of centering members mounted adjacent said support for movement inwardly toward said reference line for engaging the lower end of the fruit and pivoting the lower end about said fixed upper end to move the core axis into substantial registry with said vertical reference line.

References Cited in the file of this patent

UNITED STATES PATENTS

| | | |
|---|---|---|
| 2,225,979 | Carroll | Dec. 24, 1940 |
| 3,101,833 | Rodriques | Aug. 27, 1963 |